United States Patent
Takeda et al.

(10) Patent No.: US 11,200,678 B2
(45) Date of Patent: Dec. 14, 2021

(54) IMAGE-BASED MASK FRAME INTERPOLATION

(71) Applicant: SONY CORPORATION, Tokyo (JP)

(72) Inventors: Hiroyuki Takeda, San Jose, CA (US); Mohammad Gharavi-Alkhansari, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 274 days.

(21) Appl. No.: 16/573,272

(22) Filed: Sep. 17, 2019

(65) Prior Publication Data
US 2021/0082122 A1    Mar. 18, 2021

(51) Int. Cl.
*G06T 7/143*    (2017.01)
*G06T 7/11*    (2017.01)
(Continued)

(52) U.S. Cl.
CPC ............ *G06T 7/143* (2017.01); *G06K 9/4642* (2013.01); *G06N 3/04* (2013.01); *G06N 3/08* (2013.01);
(Continued)

(58) Field of Classification Search
CPC . G06T 7/143; G06T 7/11; G06T 7/194; G06T 2207/10024; G06T 2207/10016;
(Continued)

(56) References Cited

U.S. PATENT DOCUMENTS 6,870,945 B2 * 3/2005 Schoepflin .............. G06T 7/254
348/169
7,295,700 B2 11/2007 Schiller et al.
(Continued)

FOREIGN PATENT DOCUMENTS

CN    107506774 A    12/2017

OTHER PUBLICATIONS

A. Elgammal, R. Duraiswami, D. Harwood and L. S. Davis, "Background and foreground modeling using nonparametric kernel density estimation for visual surveillance," Proc IEEE, vol. 90, No. 7, pp. 1151-1163, Jul. 2002.*
(Continued)

*Primary Examiner* — Xuemei G Chen
(74) *Attorney, Agent, or Firm* — Chip Law Group

(57) ABSTRACT

An electronic apparatus and method for image-based mask frame interpolation is provided. The electronic apparatus receives a sequence of image frames, including a group of image frames and an intermediate image frame. The electronic apparatus generates foreground (FG) masks based on application of a trained Neural Network on the group of image frames and selects a Region-of-Interest (RoI) from a first image frame of the group of image frames. The electronic apparatus extracts first feature vectors for pixels within the selected RoI and second feature vector for a first pixel of the intermediate image frame. The electronic apparatus estimates a first mask value for the first pixel based on application of a statistical function on the first feature vectors and the second feature vector and generates an intermediate FG mask based on the estimated first mask value and re-estimation of mask values for remaining pixels of the intermediate image frame.

20 Claims, 5 Drawing Sheets

(51) Int. Cl.
*G06T 7/194* (2017.01)
*G06K 9/46* (2006.01)
*G06N 3/08* (2006.01)
*G06N 3/04* (2006.01)

(52) U.S. Cl.
CPC .............. *G06T 7/11* (2017.01); *G06T 7/194* (2017.01); *G06T 2207/10016* (2013.01); *G06T 2207/10024* (2013.01); *G06T 2207/20076* (2013.01); *G06T 2207/20081* (2013.01); *G06T 2207/20084* (2013.01)

(58) Field of Classification Search
CPC . G06T 2207/20084; G06T 2207/20081; G06T 2207/20076; G06T 7/277; G06T 2207/20028; G06K 9/4642; G06K 9/00671; G06K 9/6272; G06N 3/08; G06N 3/04; G06N 3/0454; G06N 3/0481; G06N 3/0445
See application file for complete search history.

(56) References Cited

U.S. PATENT DOCUMENTS

| | | | |
|---|---|---|---|
| 7,397,948 B1* | 7/2008 | Cohen | G06T 7/11 382/164 |
| 9,247,129 B1* | 1/2016 | Gray | G06T 5/30 |
| 10,198,621 B2 | 2/2019 | Takeda et al. | |
| 10,402,689 B1* | 9/2019 | Bogdanovych | G06T 11/60 |
| 10,477,220 B1* | 11/2019 | Takeda | G06T 7/143 |
| 10,803,604 B1* | 10/2020 | Gui | G06T 7/248 |
| 2004/0081359 A1* | 4/2004 | Bascle | G06K 9/4633 382/181 |
| 2007/0237393 A1* | 10/2007 | Zhang | G06T 7/143 382/173 |
| 2007/0273765 A1* | 11/2007 | Wang | G06K 9/38 348/152 |
| 2009/0315996 A1* | 12/2009 | Guler | G06K 9/00671 348/169 |
| 2010/0208998 A1* | 8/2010 | Van Droogenbroeck | G06T 7/215 382/195 |
| 2014/0002441 A1* | 1/2014 | Hung | G06T 7/593 345/419 |
| 2015/0248767 A1* | 9/2015 | Poree | G06T 7/215 382/164 |
| 2016/0171293 A1* | 6/2016 | Li | G06T 7/90 382/103 |
| 2016/0259990 A1* | 9/2016 | Yamanaka | G06K 9/342 |
| 2017/0200315 A1* | 7/2017 | Lockhart | H04N 13/296 |
| 2018/0068431 A1* | 3/2018 | Takeda | G06T 7/70 |
| 2018/0150955 A1* | 5/2018 | Takeda | G06K 9/00228 |
| 2019/0311202 A1* | 10/2019 | Lee | G06K 9/6256 |
| 2019/0325561 A1* | 10/2019 | Anilkumar | G06T 3/4076 |
| 2019/0325578 A1* | 10/2019 | Mohammad | G06T 7/194 |
| 2020/0013142 A1* | 1/2020 | Kobayashi | G06T 7/248 |
| 2020/0074642 A1* | 3/2020 | Wilson | G06T 7/269 |
| 2020/0193609 A1* | 6/2020 | Dharur | G06T 7/11 |
| 2020/0300763 A1* | 9/2020 | Khater | G01N 33/5005 |
| 2021/0049759 A1* | 2/2021 | Madabhushi | G06T 7/0012 |
| 2021/0248427 A1* | 8/2021 | Guo | G06K 9/4642 |

OTHER PUBLICATIONS

H. Zhou, et al., "Object tracking using sift features and mean shift," Computer Vision and Image Understanding, vol. 113, pp. 345-352, 2009.*

Yang, et al., "Video Segmentation via Multiple Granularity Analysis", 2017 IEEE Conference on Computer Vision and Pattern Recognition (CVPR), Jul. 21-26, 2017, pp. 3010-3019.

Tsai, et al., "Video Segmentation via Object Flow", 2016 IEEE Conference on Computer Vision and Pattern Recognition (CVPR), vol. 1, 2016, pp. 1-10.

Andrews Sobral, "BGSLibrary: An OpenCV C++ Background Subtraction Library", IX Workshop de Visão Computacional (WVC'2013), Jun. 2013, 06 pages.

Bouwmans, et al., "Background Modeling using Mixture of Gaussians for Foreground Detection—A Survey", Recent Patents on Computer Science, Bentham Science Publishers, vol. 1, No. 3, Nov. 12, 2008, 20 pages.

B.W. Silverman, "Density Estimation for Statistics and Data Analysis", Monographs on Statistics and Applied Probability, London: Chapman and Hall, 1986, pp. 1-22.

Lecun, et al., "Gradient-Based Learning Applied to Document Recognition", Proceedings of the IEEE, vol. 86, No. 11, Nov. 1998, pp. 1-46.

Long, et al., "Fully Convolutional Networks for Semantic Segmentation", 2015 IEEE Conference on Computer Vision and Pattern Recognition (CVPR), Jun. 7-12, 2015, pp. 1-10.

"Segmentation Results: VOC2012", Pascal VOC Challenge performance evaluation and download server, 08 pages.

* cited by examiner

IMAGE-BASED MASK FRAME INTERPOLATION

CROSS-REFERENCE TO RELATED APPLICATIONS/INCORPORATION BY REFERENCE

None.

FIELD

Various embodiments of the disclosure relate to machine learning-based image processing, computer vision, and camera technologies. More specifically, various embodiments of the disclosure relate to an electronic apparatus and a method for image-based mask frame interpolation.

BACKGROUND

Advancements in object segmentation technology have led to development of various techniques that facilitate segmentation of one or more objects from a sequence of image frames. These objects may be moving objects or may be stationary objects in the sequence of image frames. In order to segment an object from an image, a foreground mask may be determined. In one of the conventional approaches for object segmentation, a pre-determined, completely static background (BG) image is subtracted from a captured image. The pre-determined static background (BG) image may be generated at the beginning of the object segmentation process based on multiple sequential images of the background (BG) scene and by taking an average of such sequential images. The remaining pixels in the subtracted image may be labeled as the foreground pixels. However, the foreground pixels may include erroneously determined foreground pixels. For example, at the time of generation of the pre-determined static background (BG) image, moving objects may be present in the scene or the camera may be displaced from an original position. Such errors may require redetermination of the static background (BG) image.

In another conventional approach, depth information may be utilized to identify foreground pixels. However, the depth information may be unreliable for determination of foreground pixels as a result of noise present in most depth map sensors. Such noise may cause unevenness in the boundaries of the identified foreground regions obtained based on the depth information. Also, such noisy depth information may cause generation of undesired gaps or holes within the foreground regions. Other methods of segmentation like shape based object segmentation are also known in the art but most of the conventional methods are either fast but inaccurate or accurate but too slow. Therefore, a fast and accurate method for object segmentation is required.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic apparatus and method for image-based mask frame interpolation is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed electronic apparatus and method for image-based interpolation of mask frames. Exemplary aspects of the disclosure provide an electronic apparatus that relies on a statistical approach (e.g., mean-shift filtering or cross-bilateral filtering) to interpolate (in time) missing foreground (FG) mask(s) for few image frames in a sequence of image frames. These missing FG masks may have been missed by a slow, but accurate neural network while processing the sequence of image frames.

The disclosed electronic apparatus uses the slow, but accurate neural network to generate FG masks for a group of image frames in the sequence of image frames. In order to interpolate the missing FG mask(s), a Region-of-Interest (RoI) may be selected from a one of the group of image frames and feature vectors for pixels within the selected RoI may be extracted along with a feature vector for a pixel of an image frame among the few image frames with missing FG masks. The disclosed electronic apparatus estimates a mask value for the pixel using statistical function(s) on the extracted feature vectors and repeats the above process for remaining pixels of the image frame to generate the missing FG mask for the image frame.

The disclosed electronic apparatus utilizes a single pre-trained neural network, for example, a slow (i.e. high computationally complexity) but accurate convolutional neural network (CNN), to detect FG regions from image frames and to output a final FG mask for the image frames. In contrast with conventional approaches, the use of the statistical approach to generate the missing FG masks may compensate for the time complexity and slowness of the neural network and may ensure that all FG masks follow the temporal order of the sequence of image frames. Additionally, the disclosed electronic apparatus may precisely segment FG regions from image frames using the FG masks, thereby ensuring that these FG masks are accurate enough to ensure a low segmentation error, as compared to the conventional approaches for object segmentation.

Figure 1:
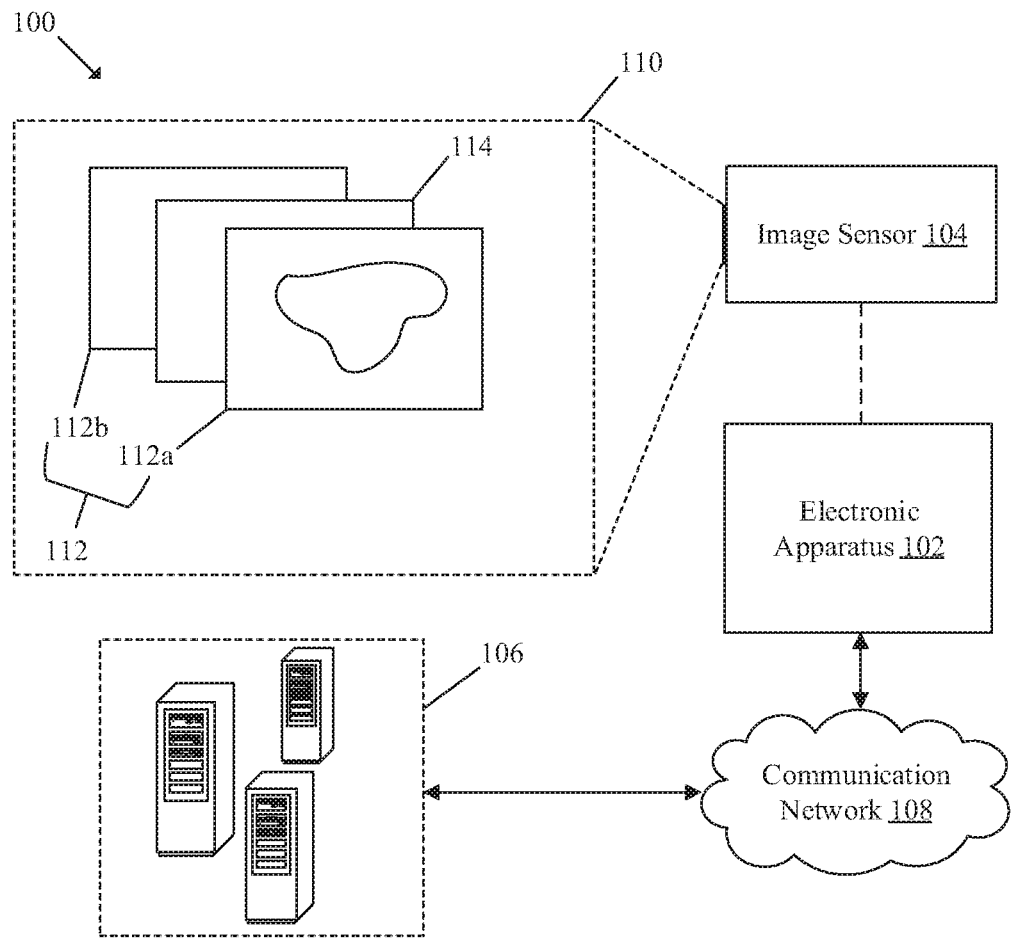
FIG. 1 is a diagram that illustrates a network environment for image-based interpolation of mask frames, in accordance with an embodiment of the disclosure.

FIG. 1 is a diagram that illustrates a network environment for image-based interpolation of mask frames, in accordance with an embodiment of the disclosure. With reference to FIG. 1, there is shown a network environment 100. The network environment 100 may include an electronic apparatus 102, an image sensor 104, a server 106, and a communication network 108. The electronic apparatus 102 may be communicatively coupled to the server 106, via a communication network 108. There is further shown a sequence of image frames 110 that include a group of image frames 112 and an intermediate image frame 114. As an example, the group of image frames 112 may include a first image frame 112a and a second image frame 112b adjacent to the intermediate image frame 114. Each image frame in the sequence of image frames 110 may include an object-of-interest as part of a foreground (hereinafter, FG) region.

The electronic apparatus 102 may include suitable logic, circuitry, interfaces, and/or code that may be configured to generate an intermediate FG mask i.e. a missing FG mask, for the intermediate image frame 114 along with a group of FG masks for the group of image frames 112. The functionalities of the electronic apparatus 102 may be implemented in portable devices, such as a high-speed computing device, or a camera, and/or non-portable devices, such as a server. Examples of the electronic apparatus 102 may include, but are not limited to, a digital camera, a digital camcorder, a camera phone, a smart phone, a virtual reality device, a gaming console, a mobile device, or a hardware video player. Other examples of the electronic apparatus 102 may include, but are not limited to a television, a home entertainment system, an augmented reality device, and a smart wearable (such as a smart glass).

The image sensor 104 may include suitable logic, circuitry, interfaces, and/or code that may be configured to capture the sequence of image frames 110. The image sensor 104 may have suitable optical instruments such as lenses and actuators for the lenses to focus on a scene and/or a particular object-of-interest in the scene. Examples of implementation of the image sensor 104 may include, but are not limited to, a passive pixel sensor, an active pixel sensor, a semiconductor charged coupled device (CCD) based image sensor, a Complementary metal-oxide-semiconductor (CMOS)-based image sensor, a backlit CMOS sensor with a global shutter, a Silicon-on-Insulator (SOI)-based single-chip image sensor, an N-type metal-oxide-semiconductor based image sensor, a flat panel detector, or other image sensors. In FIG. 1, the electronic apparatus 102 and the image sensor 104 are shown as two separate devices; however, in some embodiments, the entire functionality of the image sensor 104 may be included in the electronic apparatus 102, without a deviation from scope of the disclosure.

The server 106 may include suitable logic, circuitry, and interfaces that may be configured to store the sequence of image frames 110. Optionally, the server 106 may also store training data for a neural network that outputs FG masks for color images as input to the neural network. The server 106 may be also responsible to training of the neural network on the training data. Examples of the server 106 may include, but are not limited to, a database server, a file server, a web server, a cloud server, an application server, a mainframe server, or other types of servers.

The communication network 108 may include a communication medium through which the electronic apparatus 102 and the server 106 may communicate with each other. Examples of the communication network 108 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 108, in accordance with various wired and wireless communication protocols. Examples of such wired and wireless communication protocols may include, but are not limited to, a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the image sensor 104 may be configured to capture the sequence of image frames 110, including but not limited to, the group of image frames 112 and the intermediate image frame 114. The intermediate image frame 114 may be adjacent to the first image frame 112a of the group of image frames 112, more specifically, the first image frame 112a may immediately precede or succeed the intermediate image frame 114.

The electronic apparatus 102 may be configured to receive the sequence of image frames 110 from the server 106. In some scenarios, the received sequence of image frames 110 may be displayed to a user associated with the electronic apparatus 102 and a user input may be received to generate FG masks for the sequence of image frames 110. Additionally, in certain instances, the user input may also include a request to segment the FG region (e.g., including object(s)-of-interest in the FG region) from each image frame of the sequence of image frames 110.

In order to generate FG masks for the sequence of image frames 110, a neural network may be employed. The neural network may be pre-trained on a dataset of input color images and their respective FG masks to detect the FG region from a color image frame and to output a FG mask for the detected FG region. In at least one exemplary embodiment, the neural network may be a Convolutional Neural Network (CNN). The output rate for the neural network may be lower than the particular frame rate of the sequence of image frames 110. By way of example, a video with a frame rate of 30 frames per second may be provided as an input to the neural network. To process the video in near real time, the neural network may have about 33 milliseconds per frame to output a FG mask. In instances where the neural network is trained to output precise and high quality FG masks, it may be difficult to output the FG mask within 33 milliseconds. Therefore, the neural network may skip one or more intermediate image frames by the time the neural network processes the first image frame of the video and waits for the next image frame. As a result, FG masks may be generated at a lower rate, such as 20 FPS where one middle image frame in every three consecutive image frames of the video may be skipped.

The electronic apparatus 102 may be configured to generate a group of FG masks based on the application of the neural network on the received sequence of image frames 110. The neural network may accept the sequence of image frames 110 with a particular frame rate as input and output the group of FG masks for a selected number of image frames of the sequence of image frames 110. The neural network may be a slow network that generates the group of FG masks for the group of image frames 112 while skips intermediate image frame(s) of the sequence of image frames 110. This may be undesirable in scenarios, such as live streaming, where FG masks for all image frames may be needed to efficiently segment FG region(s) from respective image frames in near real time. Therefore, while the trained neural network outputs the group of FG masks for the group of image frames 112, intermediate FG mask(s) for rest of intermediate image frame 114(s) may be generated in parallel based on an image-based mask frame interpolation method, as described in detail, for example, in FIG. 3 and FIG. 4. It may be ensured that the processing time to generate the intermediate FG mask(s) remains within a timeframe in which the group of FG masks are generated so as to ensure that a temporal order of FG masks follow the temporal order of the sequence of image frames. The use of the trained neural network and the image-based mask frame interpolation method may improve the overall processing time for the sequence of image frames 110 and may be useful for generation of FG masks in near real-time applications, for example, live streaming of an FG segmented video.

In order to generate the intermediate FG mask for an FG region of the intermediate image frame 114, a mask value for each pixel of the intermediate image frame may have to be estimated. In case the intermediate FG mask is selected to be a binary image, the mask value for a pixel of the intermediate mask image may be either a "0" or "1". Here, "0" may denote that the pixel belongs to a background (BG) region of the intermediate image frame 114 and "1" may denote that the pixel belongs to the FG region of the intermediate image frame 114.

The electronic apparatus 102 may be configured to select a Region-of-Interest (hereinafter, RoI) from a first image frame 112*a* of the group of image frames 112. Such a selection of the RoI may be performed based on a first FG mask of the first image frame 112*a* which immediately precedes or succeeds the intermediate image frame 114. By way of example, the RoI may be sampled from the first image frame 112*a* based on a sliding window-based selection of a patch of the first FG mask, including portions of BG and FG regions. The electronic apparatus 102 may be further configured to extract a set of first feature vectors for a group of pixels within the selected RoI. The set of first feature vectors may include information about the group of pixels within the selected RoI and may be extracted based on pixel-level information and temporal information of the group of pixels in the selected RoI. For example, each feature vector of the set of first feature vectors may include an RGB value, a spatial position, and a temporal position of a corresponding pixel in the selected RoI. Additionally, in certain embodiments, each of the set of first feature vectors may also include a mask value for the corresponding pixel in the selected RoI.

The electronic apparatus 102 may be further configured to extract a second feature vector for a first pixel of the intermediate image frame 114. The second feature vector may include information about the first pixel of the intermediate image frame 114 and may be extracted based on pixel-level information and temporal information of the first pixel. For example, the second feature vector may include an RGB value, a spatial position (horizontal and vertical positions), and a temporal position of the first pixel in the intermediate image frame 114. Additionally, in some embodiments, the second feature vector may also include a seed mask value (e.g., 0.5) for the first pixel.

The electronic apparatus 102 may be further configured to apply a statistical function on the extracted set of first feature vectors and the extracted second feature vector. By way of example, the statistical function may be one of a mean-shift filter or a kernel density function as part of a cross-bilateral filter. By way of example, the application of the statistical function on the extracted set of first feature vectors and the extracted second feature vector may be used to determine an expectation value for the first pixel being in the FG region of the intermediate image frame 114. In cases where the first expectation value for first pixel is greater than a threshold expectation value, the first pixel may be classified to belong to the FG region of the intermediate image frame. The electronic apparatus 102 may estimate the first mask value as "1" based on a determination that the estimated expectation value is greater than the threshold expectation value. Otherwise, the first pixel may be classified to belong to the BG region of the intermediate FG mask and the first mask value may be estimated as "0".

It should be noted that aforementioned operations for the first pixel of the intermediate image frame 114 may be iteratively executed for all remaining pixels of the intermediate image frame 114 so to generate the intermediate FG mask. From a selected RoI, a certain set of mask values may be estimated for pixels that correspond to the selected RoI, However, for remaining pixels that correspond to other RoI(s) of the first image frame 112*a*, a sliding window approach may be used, in which a different RoI may be selected from the first image frame 112*a* by sliding a window over the first image frame 112*a*. This may be performed to estimate mask values for pixels of the intermediate image frame 114 that correspond to the different RoI in the first image frame 112*a*. In certain instances, the window may slide iteratively over an entire boundary between the FG region and the BG region in the first image frame 112*a*. The electronic apparatus 102 may be further configured to segment the FG region, including but not limited to, the object-of-interest, from the sequence of image frames 110 based on the generated group of FG masks and the generated intermediate FG mask.

Figure 2:
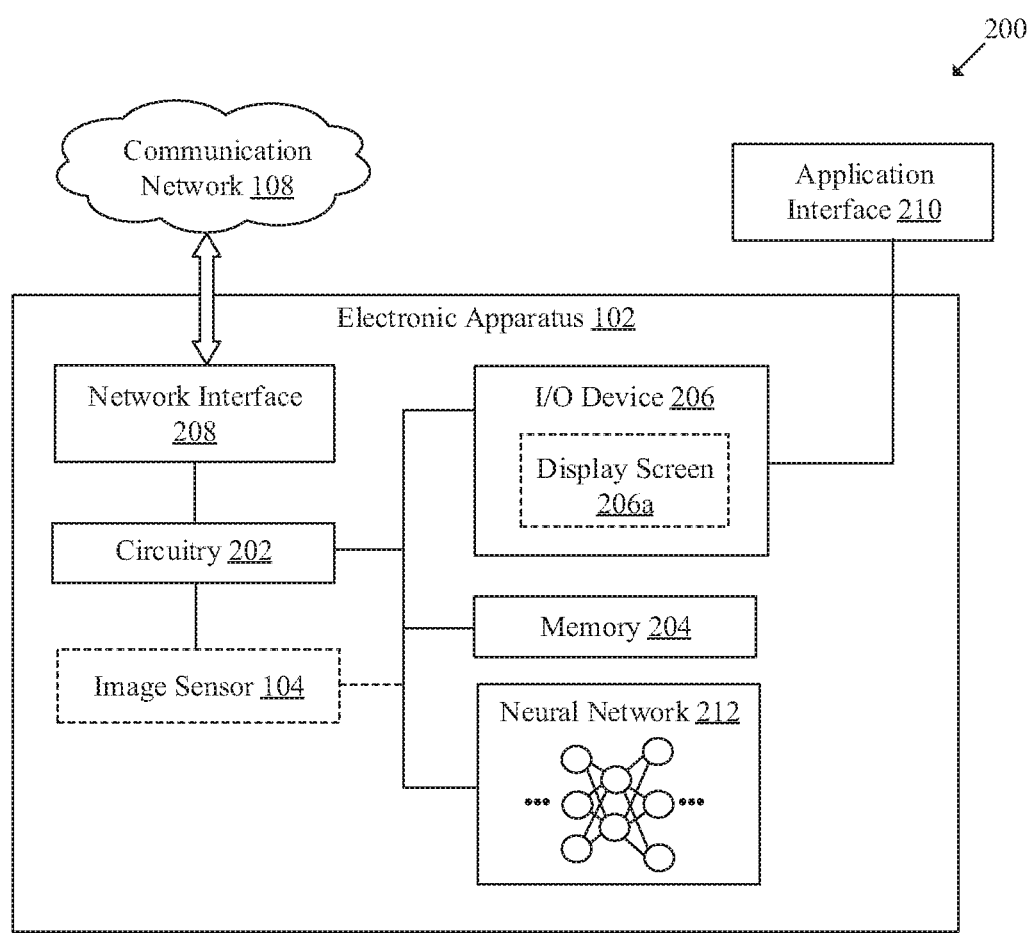
FIG. 2 is a block diagram that illustrates an exemplary electronic apparatus for image-based interpolation of mask frames, in accordance with an embodiment of the disclosure.

FIG. 2 is a block diagram that illustrates an exemplary electronic apparatus for image-based interpolation of mask frames, in accordance with an embodiment of the disclosure. FIG. 2 is explained in conjunction with elements from FIG. 1. With reference to FIG. 2, there is shown a block diagram 200 of the electronic apparatus 102. The electronic apparatus 102 may include circuitry 202, a memory 204, an input/output (I/O) device 206 (includes a display screen 206*a*), a network interface 208, an application interface 210, and a neural network 212. The circuitry 202 may be communicatively coupled to the memory 204, the I/O device 206, the network interface 208, an application interface 210, and the neural network 212. In one or more embodiments, the electronic apparatus 102 may also include provisions to capture images/videos via an image sensor 104 and allow a user to view the captured images/videos and/or apply certain operations (e.g., object segmentation operation) on the captured images/videos.

The circuitry 202 may comprise suitable logic, circuitry, interfaces, and/or code that may be configured to execute a set of operations related to generation of an FG mask for each image frame of the sequence of image frames 110. The circuitry 202 may be communicatively coupled to the image sensor 104, the memory 204, the I/O device 206, the network interface 208, the application interface 210, and the neural network 212. The circuitry 202 may be implemented based on a number of processor technologies, which may be known to one ordinarily skilled in the art. Examples of implementations of the circuitry 202 may be a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a co-processor, a central processing unit (CPU), and/or other control circuits.

The memory 204 may comprise suitable logic, circuitry, and/or interfaces that may be configured to store instructions executable by the circuitry 202. Additionally, the memory 204 may be configured to store the sequence of image frames 110 and/or a program code of the neural network 212. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may comprise suitable logic, circuitry, and/or interfaces that may be configured to act as an I/O interface between a user and the electronic apparatus 102. As an example, a user input to generate FG masks for the sequence of image frames 110 may be provided to the electronic apparatus 102 via the I/O device 206. The I/O device 206 may include various input and output devices, which may be configured to communicate with different operational components of the electronic apparatus 102. Examples of the I/O device 206 may include, but are not limited to, a touch screen, a keyboard, a mouse, a joystick, a microphone, and a display screen (for example, the display screen 206a).

The display screen 206a may comprise suitable logic, circuitry, and interfaces that may be configured to display the application interface 210. In some embodiments, the display screen 206a may be an external display device associated with the electronic apparatus 102. The display screen 206a may be a touch screen which may enable a user to provide a user-input via the display screen 206a. The display screen 206a may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display screen 206a may refer to a display screen of a head mounted device (HMD), a smart-glass device, a see-through display, a projection-based display, an electro-chromic display, or a transparent display.

The network interface 208 may comprise suitable logic, circuitry, interfaces, and/or code that may be configured to facilitate different components of the electronic apparatus 102 to communicate with the server 106 or any other device in the network environment 100, via the communication network 108. The network interface 208 may be configured to implement known technologies to support wired or wireless communication. Components of the network interface 208 may include, but are not limited to an antenna, a radio frequency (RF) transceiver, one or more amplifiers, a tuner, one or more oscillators, a digital signal processor, a coder-decoder (CODEC) chipset, an identity module, and/or a local buffer.

The network interface 208 may be configured to communicate via offline and online wireless communication with networks, such as the Internet, an Intranet, and/or a wireless network, such as a cellular telephone network, a wireless local area network (WLAN), personal area network, and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), LTE, time division multiple access (TDMA), Bluetooth, Wireless Fidelity (Wi-Fi) (such as IEEE 802.11, IEEE 802.11b, IEEE 802.11g, IEEE 802.11n, and/or any other IEEE 802.11 protocol), voice over Internet Protocol (VoIP), Wi-MAX, Internet-of-Things (IoT) technology, Machine-Type-Communication (MTC) technology, a protocol for email, instant messaging, and/or Short Message Service (SMS).

The application interface 210 may be configured as a medium for a user to interact with the electronic apparatus 102. The application interface 210 may be configured to have a dynamic interface that may change in accordance with preferences set by the user and configuration of the electronic apparatus 102. In some embodiments, the application interface 210 may correspond to a user interface of one or more applications installed on the electronic apparatus 102.

The neural network 212 may be referred to as a computational network or a system of artificial neurons, arranged in a plurality of layers, as nodes. The plurality of layers of the neural network 212 may include an input layer, one or more hidden layers, and an output layer. Each layer of the plurality of layers may include one or more nodes (or artificial neurons, represented by circles, for example). Outputs of all nodes in the input layer may be coupled to at least one node of hidden layer(s). Similarly, inputs of each hidden layer may be coupled to outputs of at least one node in other layers of the neural network 212. Outputs of each hidden layer may be coupled to inputs of at least one node in other layers of the neural network 212. Node(s) in the final layer may receive inputs from at least one hidden layer to output a result. The number of layers and the number of nodes in each layer may be determined from hyper-parameters of the neural network 212. Such hyper-parameters may be set before or while training the neural network 212 on a training dataset. Examples of the neural network 212 may include, but are not limited to, a Feed-Forward neural network, Convolutional Neural Network (CNN), a Recurrent neural network (RNN), Generative Adversarial Neural Network (GANN), a Boltzmann machine, an Auto-encoder, or a variant thereof. In certain embodiments, the neural network may be based on a hybrid architecture of multiple Deep Neural Networks (DNNs).

Each node of the neural network 212 may correspond to a mathematical function (e.g., a sigmoid function or a rectified linear unit) with a set of parameters, tunable during training of the neural network 212. The set of parameters may include, for example, a weight parameter, a regularization parameter, and the like. Each node may use the mathematical function to compute an output based on one or more inputs from nodes in other layer(s) (e.g., previous layer(s)) of the neural network 212. All or some of the nodes of the neural network 212 may correspond to same or a different same mathematical function.

The neural network 212 may include electronic data, such as, for example, a software program, code of the software program, libraries, applications, scripts, or other logic or instructions for execution by a processing device, such as the circuitry 202. The neural network 212 may include code and routines configured to enable a processing device, such as the circuitry 202 to perform one or more operations for generation of FG masks for corresponding image frames. Additionally or alternatively, the neural network 212 may be implemented using hardware including a processor, a microprocessor (e.g., to perform or control performance of one or more operations), a field-programmable gate array (FPGA), or an application-specific integrated circuit (ASIC). Alternatively, in some embodiments, the neural network 212 may be implemented using a combination of hardware and software.

In training of the neural network 212, one or more parameters of each node of the neural network 212 may be updated based on whether an output of the final layer for a given input, from the training dataset to the input layer, matches a correct result based on a loss function for the neural network 212. The above process may be repeated for same or a different input till a minima of the loss function is achieved and a training error is minimized. Several methods for training are known in art, for example, gradient descent, stochastic gradient descent, batch gradient descent, gradient boost, meta-heuristics, and the like. The functions or operations executed by the electronic apparatus 102, as described in FIG. 1, may be performed by the circuitry 202. The operations of the circuitry 202 are described in detail, for example, in FIGS. 3, 4, and 5.

Figure 3:
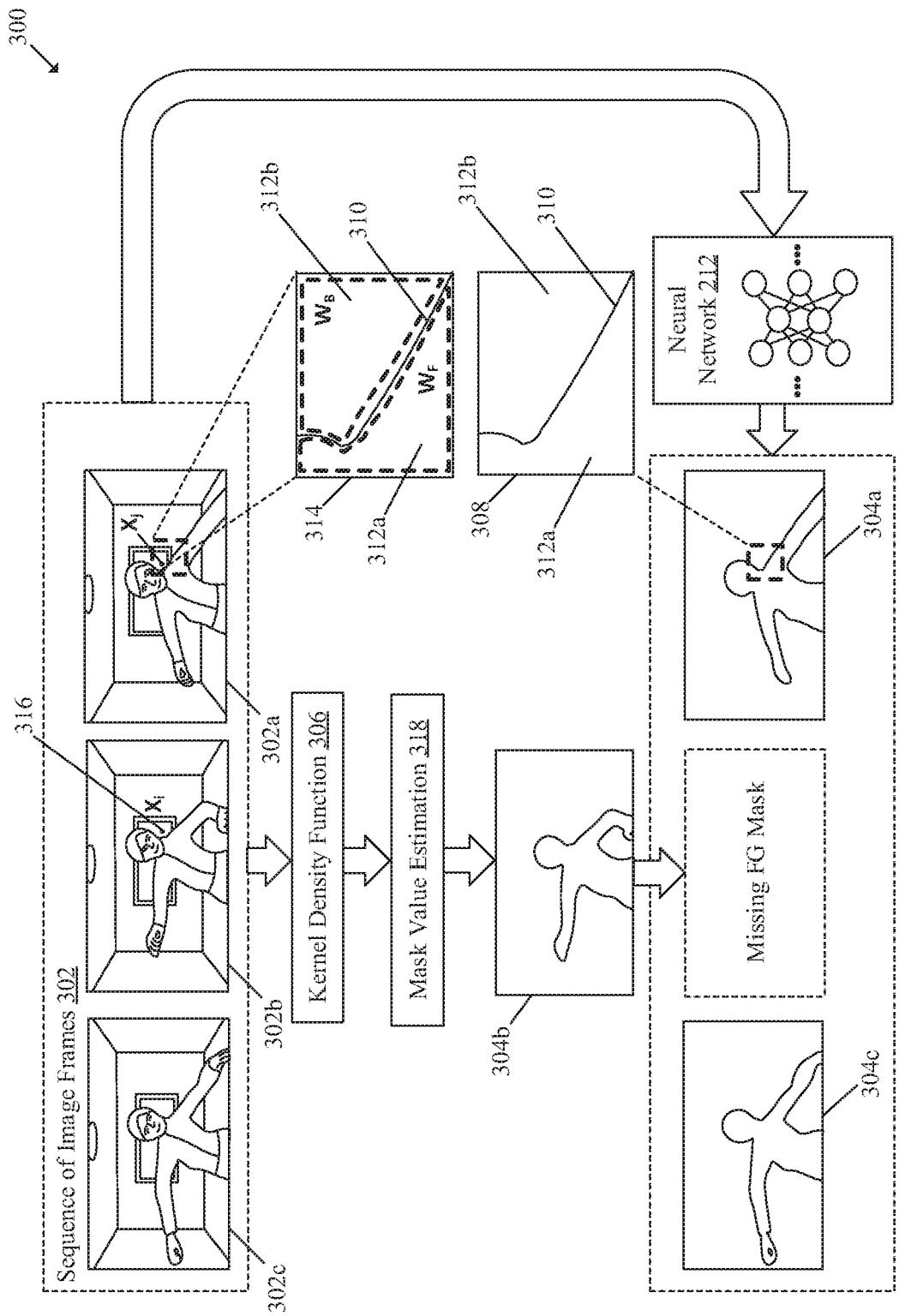
FIG. 3 is a diagram that illustrates exemplary operations for image-based interpolation of mask frames using a kernel density function, in accordance with an embodiment of the disclosure.

FIG. 3 is a diagram that illustrates exemplary operations for image-based interpolation of mask frames using a kernel density function, in accordance with an embodiment of the disclosure. FIG. 3 is explained in conjunction with elements from FIG. 1 and FIG. 2. With reference to FIG. 3, there is shown a block diagram 300 that illustrates a set of operations for image-based interpolation of mask frames, as described herein.

The electronic apparatus 102 may be configured to receive a sequence of image frames 302, which may be captured at the first frame rate. Each image frame of the sequence of image frames 302 may include an object-of-interest, for example, a human object, in the FG region of the respective image frame. As shown, the sequence of image frames 302 includes a first image frame 302a, a second image frame 302c, and an intermediate image frame 302b. The first image frame 302a and the second image frame 302c may be collectively referred to as a group of image frames 302a and 302c. The first image frame 302a immediately precedes the intermediate image frame 302b while the second image frame 302c immediately succeeds the intermediate image frame 302b.

The sequence of image frames 302 may be provided as an input to a neural network 212, which may be trained to accept the sequence of image frames 302 as input and generate a group of FG masks 304a and 304c as output for the group of image frames 302a and 302c. The generated group of FG masks 304a and 304c may correspond to binary masks of the FG region in each of the group of image frames 302a and 302c.

It should be noted that the neural network 212 may exhibit a high time complexity and hence, may take more time than a frame duration (e.g., 33 milliseconds for 30 FPS video as input) of the sequence of image frames 302 to process a single image frame to generate a respective FG mask. Additionally, or alternatively, the neural network 212 may also exhibit a high space complexity and hence, may take a significant amount of space to process every single image frame to generate the respective FG mask. As a result, the neural network 212 may skip to select one or more intermediate image frames (such as the intermediate image frame 302b) as input and instead select next image frames (such as the second image frame 302c) as input. Thus, the output of the neural network 212 may include a first FG mask 304a and a second FG mask 304c for the first image frame 302a and the second image frame 302c, respectively, while the intermediate FG mask 304b may be missing (represented by "Missing FG Mask") from the output.

Operations are described herein for the generation of the intermediate FG mask 304b using a kernel density function 306 of a cross-bilateral filter. Use of a statistical approach that involves the kernel density function 306 may help to generate accurate FG mask in a less space/time complexity as compared to the conventional approaches.

The electronic apparatus 102 may be configured to determine an initial RoI 308 from the first FG mask 304a. As an example, the initial RoI 308 may correspond to a sampled region of the first FG mask 304a and may belong to a local window on the first FG mask 304a. The sampled region may include a boundary 310 that divides the sampled region into a FG region 312a and a BG region 312b. Once the initial RoI 308 is determined, the electronic apparatus 102 may be further configured to select a RoI 314 from the first image frame 302a based on the selected initial RoI 308. The selected RoI 314 may be partitioned into the FG region 312a and the BG region 312b and such a partition may be performed based on the boundary 310 between the FG region 312a and the BG region 312b on the first FG mask 304a.

The electronic apparatus 102 may be further configured to extract a set of first feature vectors from the first image frame 302a. The set of feature vectors may include a first group of feature vectors for a first group of pixels in the FG region 312a and a second group of feature vectors for a second group of pixels in the BG region 312b. Each feature vector may include information that describes characteristics (such as intensity, position, color) of a corresponding pixel.

The extraction of the set of first feature vectors may be performed based on pixel information and temporal information of group of pixels in the selected RoI 314. By way of example, a first feature vector (denoted by "$X_j$") for a $j^{th}$ pixel of the first image frame 302a may be given as follows:

$$X_j=[r,g,b,h,v,t]$$

where, r, g, b may denote the RGB values of the $j^{th}$ pixel, h and v may denote the spatial position, i.e. a horizontal position and a vertical position, respectively, of the $j^{th}$ pixel, and t may denote the temporal position of the $j^{th}$ pixel.

For example, "t" may be 1 for all pixels in the first image frame 302a while "t" may be incremented by 1 for all successive frames.

The electronic apparatus 102 may be further configured to extract a second feature vector for a first pixel 316 (i.e. an $i^{th}$ pixel) of the intermediate image frame 302b. Herein, the first pixel 316 may belong to a region of the intermediate image frame 302b which corresponds to the selected RoI 314 of the first image frame 302a. The second feature vector may be extracted from the intermediate image frame 302b and may include an RGB value, a spatial value, and a temporal position for the first pixel 316. By way of example, the second feature vector (denoted by "$X_i$") for an $i^{th}$ pixel (e.g., the first pixel 316) of the intermediate image frame 302b may be given as follows:

$$X_i=[r,g,b,h,v,t]$$

where, r, g, b may denote the RGB values of the $i^{th}$ pixel, h and v may denote the spatial position of the $i^{th}$ pixel, and t may denote the temporal position of the $i^{th}$ pixel.

The electronic apparatus 102 may be further configured to estimate an expectation value for the first pixel 316 being in the FG region 312a or the BG region 312b of the intermediate image frame 302b. Such an estimation may be performed by application of the kernel density function 306 on the extracted set of first feature vectors (as represented by $X_j$) and the second feature vector (as represented by $X_i$).

By way of example, the expectation value (E(m)) for the $i^{th}$ pixel (e.g., the first pixel 316) may be estimated using equation (1), as follows:

$$E[m]=m_{FG}P(m=m_{FG})+m_{BG}P(m=m_{BG}) \qquad (1)$$

where, m may denote the mask value for the $i^{th}$ pixel of the intermediate image frame 302b,
P(.) may denote that a probability function for the expectation value function (E(m)). It may be assumed that the mask value for the $i^{th}$ pixel of the intermediate image frame 302b is either 0 or 1, where 0 ($m_{BG}=0$) may denote that the $i^{th}$ pixel belongs to the BG region 312b and 1 ($m_{FG}=1$) may denote that the $i^{th}$ pixel belongs to the FG region 312a. Since $m_{BG}=0$ and $m_{FG}=1$, equation (1) may be simplified to equation (2), as follows:

$$E[m]=m_{FG}P(m=m_{FG})+m_{BG}P(m=m_{BG})=P(m=m_{FG}) \qquad (2)$$

Using the kernel density function 306, E[m] for the $i^{th}$ pixel may be calculated using equation (3), as follows:

$$E[m_i] = P(m_i = m_{FG}) = \frac{\Sigma_{j \in W_F} K_\sigma(X_j - X_i)}{\Sigma_{j \in W_F} K_\sigma(X_j - X_i) + \Sigma_{j \in W_B} K_\sigma(X_j - X_i)} \qquad (3)$$

where, $$K_\sigma(X_j - X_i) = \exp\left\{\frac{1}{2\sigma^2}(X_j - X_i)(X_j - X_i)\right\}$$

σ denotes a user parameter,
$X_i$ denotes the second feature vector of the $i^{th}$ pixel (e.g., the first pixel 316) from the intermediate image frame 302b,
exp(.) denotes exponential function,
$X_j$ denotes the first feature vector of the $j^{th}$ pixel from the first image frame 302a, and
$W_F$ and $W_B$ denote the FG region 312a and the BG region 312b, respectively, in the selected RoI 314.

The estimated expectation value may be used for a mask value estimation operation at 318, in which the electronic apparatus 102 may be configured estimate a first mask value for the first pixel 316 of the intermediate image frame 302b based on the estimated expectation value. Specifically, the estimated expectation value may be compared with a threshold expectation value, for example, 0.5. In cases where the first mask value is greater than the threshold expectation value, the first mask value for the first pixel 316 may be determined as "1" (i.e. a part of the FG region 312a). Alternatively, in cases where the first mask value is less than the threshold expectation value, the first mask value for the first pixel 316 may be determined as "0" (i.e. a part of the BG region 312b).

It should be noted that aforementioned operations for the first pixel 316 of the intermediate image frame 302b may be iteratively executed for all remaining pixels of the intermediate image frame 302b so as to generate the intermediate FG mask 304b. From the selected RoI 314, a certain set of mask values may be estimated for pixels of the intermediate image frame 302b that correspond to the selected RoI 314. However, for remaining pixels of the intermediate image frame 302b that correspond to other RoI(s) of the first image frame 302a, a sliding window approach may be used, in which a different RoI may be selected from the first image frame 302a by sliding a window over the first image frame 302a. This may be performed to estimate mask values for pixels that correspond to the different RoI in the first image frame 302a. In certain instances, the window may slide iteratively over an entire contour of the foreground of the first image frame 302a.

By way of example, the electronic apparatus 102 may be configured to estimate mask values for all remaining pixels of the intermediate image frame 302b which correspond to the selected RoI 314. After the estimation of the mask values for all the pixels (the first pixel 316 and remaining pixels), a new RoI may be selected from the first image frame 302a based on the first FG mask 304a. The mask value may be estimated for all the pixels of the intermediate image frame 302b that correspond to the new RoI. In this way, a new RoI may be selected for a number of iterations until mask values are obtained for all the pixels of the intermediate image frame 302b.

The electronic apparatus 102 may be further configured to generate the intermediate FG mask 304b based on the estimated first mask value and mask values for remaining pixels of the intermediate image frame 302b. In certain instances, the intermediate FG mask 304b may be inserted temporally in the group of FG masks 304a and 304c, so as to ensure that all the FG masks appear in the same temporal order as that of the input of the sequence of image frames 302.

Figure 4:
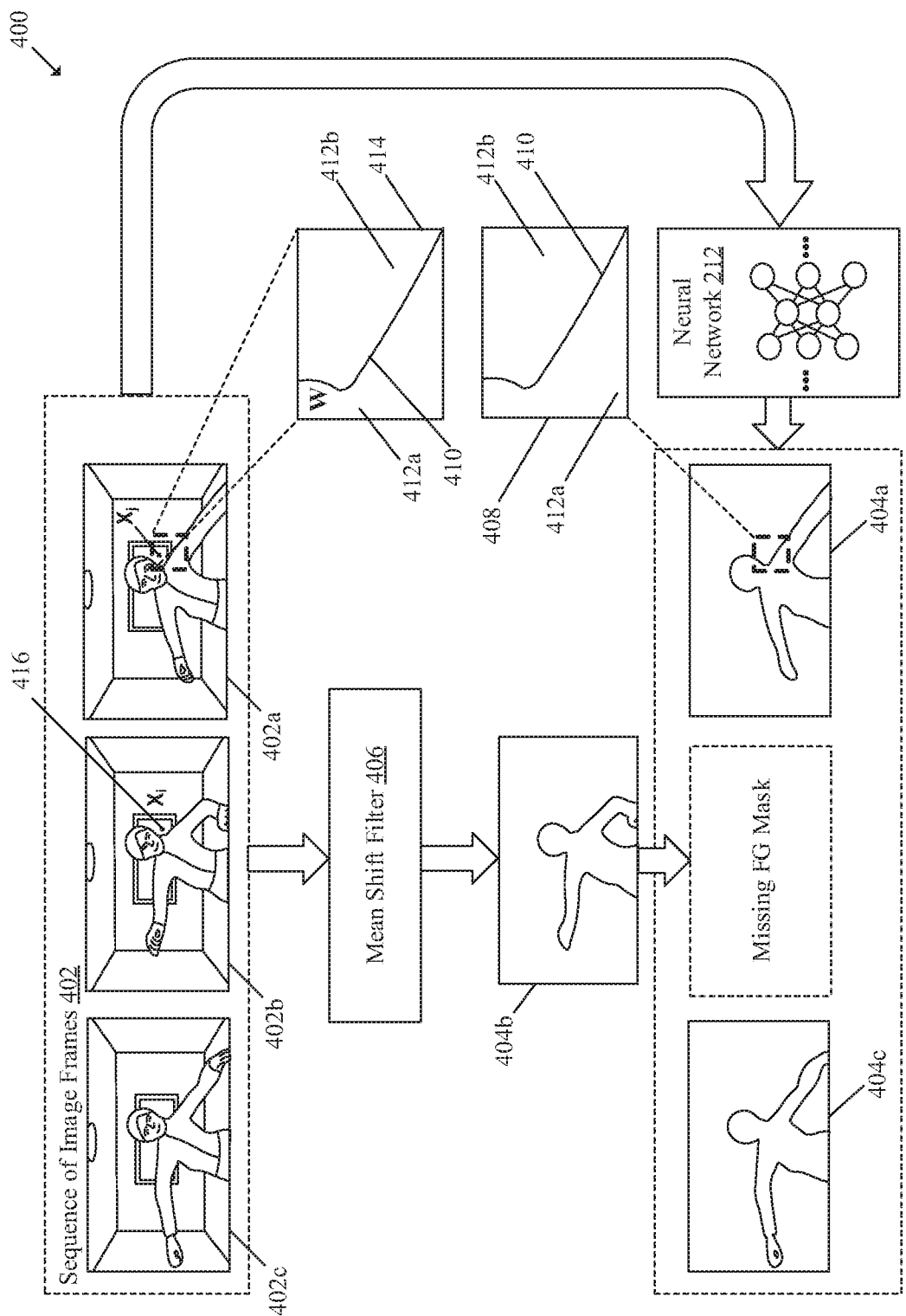
FIG. 4 is a diagram that illustrates exemplary operations for image-based interpolation of mask frames using a mean shift filter, in accordance with an embodiment of the disclosure.

FIG. 4 is a diagram that illustrates exemplary operations for image-based interpolation of mask frames using a mean shift filter, in accordance with an embodiment of the disclosure. FIG. 4 is explained in conjunction with elements from FIG. 1, FIG. 2, and FIG. 3. With reference to FIG. 4, there is shown a block diagram 400 that illustrates a set of operations, as described herein.

The electronic apparatus 102 may be configured to receive a sequence of image frames 402, which may be captured at a first frame rate. Each image frame of the sequence of image frames 402 may include an object-of-interest, for example, a human object, in the FG region of the respective image frame. As shown, the sequence of image frames 402 includes a first image frame 402a, a second image frame 402c, and an intermediate image frame 402b. The first image frame 402a and the second image frame 402c may be collectively referred to as a group of image frames 402a and 402c. The first image frame 402a immediately precedes the intermediate image frame 402b while the second image frame 402c immediately succeeds the intermediate image frame 402b.

The sequence of image frames 402 may be provided as input to the neural network 212. The neural network 212 may be trained to accept the sequence of image frames 402 as input and output a group of FG masks 404a and 404c as output for the group of image frames 402a and 402c. The generated group of FG masks 404a and 404c may correspond to binary masks of the group of image frames 402a and 402c.

It should be noted that the neural network 212 may exhibit a high time complexity and hence, may take more time than a frame duration (e.g., 33 milliseconds for 30 FPS video as input) of the sequence of image frames 402 to process a single image frame to generate a respective FG mask. Additionally, or alternatively, the neural network 212 may also exhibit a high space complexity and hence, may take a significant amount of space to process every single image frame to generate the respective FG mask. As a result, the neural network 212 may skip to select one or more intermediate image frames (such as the intermediate image frame 402b) as input and instead select next image frames (such as the second image frame 402c) as input. Thus, the output of the neural network 212 may include a first FG mask 304a and a second FG mask 304c for the first image frame 402a and the second image frame 402c, respectively, while the intermediate FG mask 404b may be missing (represented by "Missing FG Mask") from the output.

Operations are described herein for the generation of the intermediate FG mask 404b using a mean shift filter 406. Use of a statistical approach that involves the mean shift filter 406 may help to generate accurate FG masks with a less time complexity as compared to conventional approaches.

The electronic apparatus 102 may be configured to determine an initial RoI 408 from the first FG mask 304a. As an example, the initial RoI 408 may correspond to a sampled region of the first FG mask 304a and may belong to a local window on the first FG mask 304a. The sampled region may include a boundary 410 that divides the sampled region into a FG region 412a and a BG region 412b. Once the initial RoI 408 is determined, the electronic apparatus 102 may be further configured to select a RoI 414 from the first image frame 402a based on the selected initial RoI 408.

The electronic apparatus 102 may be further configured to extract a set of first feature vectors from the first image frame 402a. Each feature vector may include information that describes characteristics (such as intensity, position, color) of a corresponding pixel. The extraction of such set of first feature vectors may be performed based on pixel information and temporal information of a group of pixels in the selected RoI 414. By way of example, a first feature vector (denoted by "$X_j$") for a $j^{th}$ pixel of the first image frame 402a may be given, as follows:

$$X_j = [r, g, b, h, v, t, m']$$

where,
r, g, b may denote the RGB values of the $j^{th}$ pixel,
h and v may denote the spatial position of the $j^{th}$ pixel, and
t may denote the temporal position of the $j^{th}$ pixel,
m' may be referred to a mask value for the $j^{th}$ pixel.
For example, "t" may be 1 for all pixels in the first image frame 402a while "t" may be incremented by 1 for all successive frames.

The electronic apparatus 102 may be further configured to extract a second feature vector for a first pixel 416 (i.e. an $i^{th}$ pixel) of the intermediate image frame 402b. Herein, the first pixel 416 may belong to a region of the intermediate image frame 402b which corresponds to the selected RoI 414 of the first image frame 402a. The second feature vector may be extracted from the intermediate image frame 402b and may be initialized to include an RGB value, a spatial value, a temporal position for the first pixel 416, and a seed mask value for the first pixel 416. The seed mask value may be initialized with 0.5 as its correct mask value is yet to be estimated.

By way of example, a second feature vector (denoted by "$X_i$") for the $i^{th}$ pixel (e.g., the first pixel 416) of the intermediate image frame 402b may be given as follows:

$$X_i = [r, g, b, h, v, t, m]$$

where,
r, g, b may denote the RGB values of the $i^{th}$ pixel,
h and v may denote the spatial position, i.e. a vertical coordinate and a horizontal coordinate, respectively, of the $i^{th}$ pixel, and
t may denote the temporal position of the $i^{th}$ pixel,
m may denote the seed mask value (e.g., 0.5) for the $i^{th}$ pixel and may be used to determine the mask value for the $i^{th}$ pixel in the intermediate FG mask 404b. Initially, the seed mask value for the $i^{th}$ pixel may be set to 0.5.

The electronic apparatus 102 may be further configured to pass the extracted set of first feature vectors (e.g., $X_j$) and the second feature vector (e.g., $X_i$) to the mean shift filter 406. The mean shift filter 406 may find modes (or peaks) of a probability density function (PDF) for feature vectors. The value of the second feature vector at a mode of the PDF may include a correct mask value for the first pixel 416. It may be possible to use a mean-shift vector pertaining to the mean shift filter 406 to move towards the direction of maximum increase in the probability density. By iteratively tracing the mean shift vector or by application of the mean shift filter 406 multiple times, such as "L" times, the nearest mode may be found and the mask value for first pixel 416 may be obtained.

The electronic apparatus 102 may be configured to update the second feature vector based on application of the mean shift filter 406 on the set of first feature vectors and the second feature vector. The updated second feature vector may include an updated seed mask value. By way of example, the application of the mean shift filter 406 on the $j^{th}$ pixel (e.g., the first pixel 416) in the selected RoI 414 (or window (W)) may be based on equation (4), as follows:

$$X_i^{(L+1)} = \frac{\sum_{j \in W} X_j \, K_H \, (X_i^{(L)} - X_j)}{\sum_{j \in W} K_H \, (X_i^{(L)} - X_j)} \quad (4)$$

where KH denotes a multivariate Gaussian function.

Every time the mean shift filter 406 is applied, the seed mask value of the second feature vector may be updated following equation (4). The above process (e.g., using equation (4)) may be repeated until the nearest mode is found and a convergence condition is satisfied.

The electronic apparatus 102 may be further configured to compare the updated seed mask value in the second feature vector with a threshold value and correct the updated seed mask value based on the comparison of the updated seed mask value with the threshold value. By way of example, the threshold value may be set to 0.5 and for $L^{th}$ iteration, i.e. L+1, the updated second feature vector may be given as follows:

$$X_i^{L+1} = [r^{L+1}, g^{L+1}, b^{L+1}, h^{L+1}, v^{L+1}, t^{L+1}, m^{L+1}]$$

The updated seed mask value (i.e. ($m^{L+1}$) may be compared with the threshold value (0.5). The updated seed mask value may be corrected to "0" if the value of the updated seed mask value is less than or equal to 0.5. Whereas, if the updated seed mask value is greater than 0.5, the updated seed mask value may be corrected to "1". The electronic apparatus 102 may be further configured to estimate the first mask value for the first pixel 416 as the corrected seed mask value. Such an estimation may be based on the updated second feature vector satisfying the convergence condition.

It should be noted that aforementioned operations for the first pixel 416 of the intermediate FG mask 404b may be iteratively executed for all remaining pixels of the intermediate image frame 402b so to generate the intermediate FG mask 404b. From the selected RoI 414, certain set of mask values may be estimated for pixels that correspond to the selected RoI 414, However, for remaining pixels that correspond to other RoI(s) of the first image frame 402a, a sliding window approach may be used, in which a different RoI may be selected from the first image frame 402a by sliding a window over the first image frame 402a. This may be performed to estimate mask values for pixels that correspond to the different RoI of the first image frame 402a. In certain instances, the window may slide iteratively over an entire contour of the foreground of the first image frame 402a.

By way of example, the electronic apparatus 102 may be configured to estimate mask values for all remaining pixels of the intermediate image frame 402b which correspond to the selected RoI 414. After the estimation of the mask values, a new RoI may be selected from the first image frame 402a based on the first FG mask 304a. The mask value may be estimated for all the pixels of the intermediate image frame 402b that correspond to the new RoI. In this way, a new RoI may be selected for a number of iterations until mask values are obtained for all the pixels of the intermediate image frame 402b.

The electronic apparatus 102 may be further configured to generate the intermediate FG mask 404b based on the estimated mask value for the first pixel 416 and mask values for remaining pixels of the intermediate image frame 402b. In certain instances, the intermediate FG mask 404b may insert the intermediate FG mask 404b temporally in the group of FG masks 404a and 404c, so as to ensure that all FG masks appear in the same temporal order as that of the input of the sequence of image frames 402. In certain embodiments, a boundary smoothening function may be applied on all the mask values for the intermediate image frame 402b. The boundary smoothening function may include a morphological opening and a closing operation, which may be applied to smoothen the boundary of the intermediate FG mask 404b.

Figure 5:
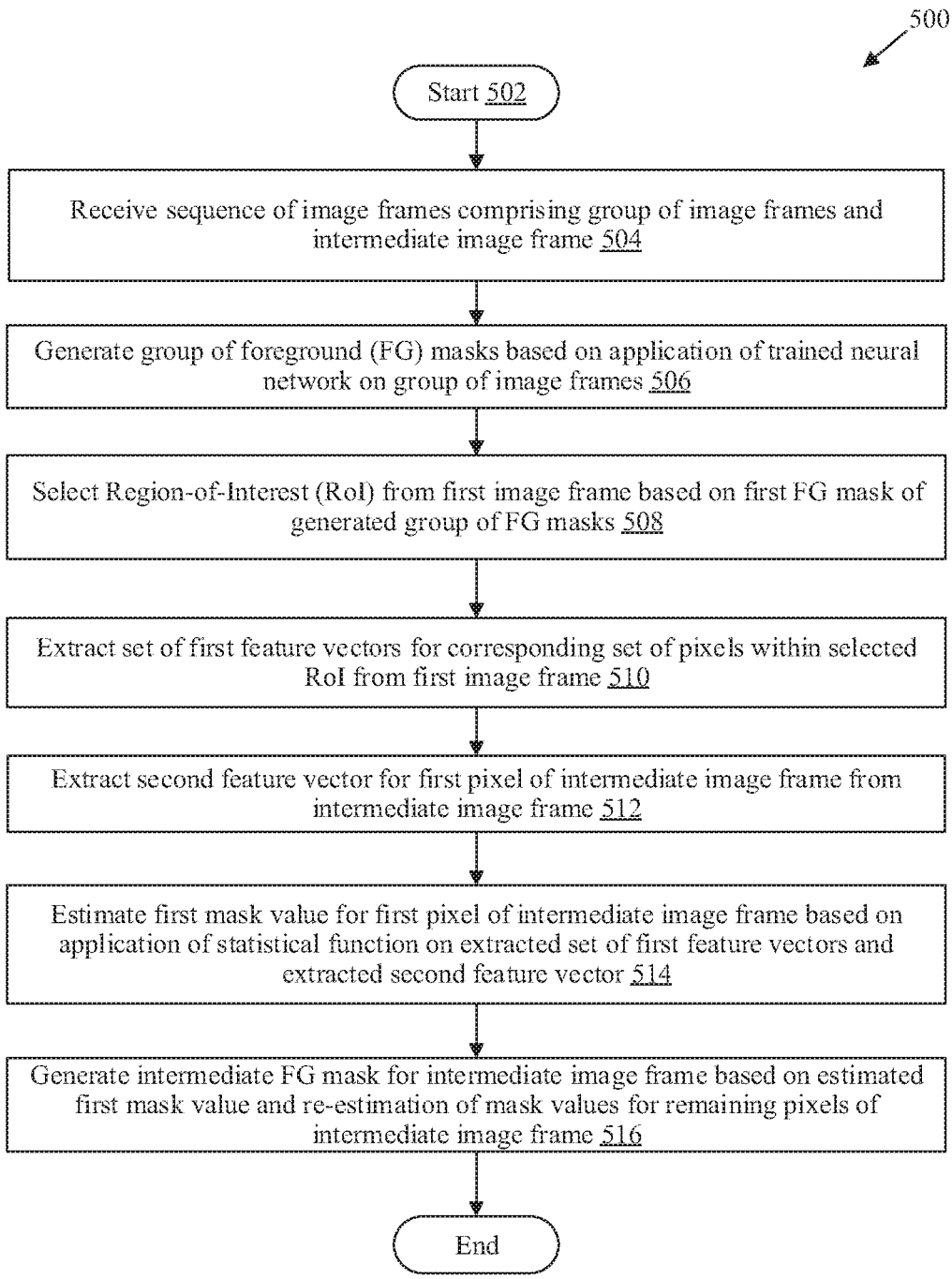
FIG. 5 is a flowchart that illustrates an exemplary method for image-based interpolation of mask frames, in accordance with an embodiment of the disclosure.

FIG. 5 is a flowchart that illustrates an exemplary method for image-based interpolation of mask frames, in accordance with an embodiment of the disclosure. With reference to FIG. 5, there is shown a flowchart 500. The operations of the exemplary method may be executed by any computing system, for example, by the electronic apparatus 102 of FIG. 2. The operations of the flowchart 500 may start at 502 and proceed to 504.

At 504, the sequence of image frames 110 including the group of image frames 112 and the intermediate image frame 114 may be received. The circuitry 202 may be configured to receive the sequence of image frames 110, including but not limited to, the group of image frames 112 and the intermediate image frame 114 adjacent to the first image frame 112a of the group of image frames 112.

At 506, a group of FG masks may be generated based on application of a trained Neural Network on the group of image frames 112. The circuitry 202 may be configured to generate the group of FG masks based on the application of the trained Neural Network the group of image frames 112.

At 508, a RoI may be selected from the first image frame 112a based on a first FG mask of the generated group of FG masks. The circuitry 202 may be configured to select the RoI from the first image frame 112a based on the first FG mask of the generated group of FG masks. The first FG mask may correspond to the first image frame 112a.

At 510, a set of first feature vectors for a corresponding set of pixels within the selected RoI may be extracted from the first image frame 112a. The circuitry 202 may be configured to extract the set of first feature vectors for the corresponding set of pixels within the selected RoI of the first image frame 112a.

At 512, a second feature vector for a first pixel of the intermediate image frame 114 may be extracted from the intermediate image frame 114. The circuitry 202 may be configured to extract the second feature vector for the first pixel of the intermediate image frame 114.

At 514, a first mask value for the first pixel of the intermediate image frame 114 may be estimated based on application of a statistical function on the extracted set of first feature vectors and the extracted second feature vector. The circuitry 202 may be configured to estimate the first mask value for the first pixel of the intermediate image frame 114 based on the application of the statistical function on the extracted set of first feature vectors and the extracted second feature vector.

At 516, the intermediate FG mask may be generated based on the estimated first mask value and re-estimation of mask values for remaining pixels of the intermediate image frame 114. The circuitry 202 may be configured to generate the intermediate FG mask based on the estimated first mask value and re-estimation of mask values for remaining pixels of the intermediate image frame 114. Control passes to end.

Various embodiments of the disclosure may provide a non-transitory computer readable medium and/or storage medium having stored thereon, instructions executable by a machine and/or a computer to operate an electronic apparatus for image-based mask frame interpolation. The instructions may cause the machine and/or computer to perform operations that include reception of a sequence of image frames including a group of image frames and an intermediate image frame adjacent to a first image frame of the group of image frames. The operations further include generation of a group of FG masks based on application of a trained Neural Network on the group of image frames. The operations further include selection of a RoI from the first image frame based on a FG mask of the generated group of FG masks. The first FG mask corresponds to the first image frame. The operations further include extraction of a set of first feature vectors for a corresponding set of pixels within the selected RoI from the first image frame and extraction of a second feature vector for a first pixel of the intermediate image frame from the intermediate image frame. The operations further include estimation of a first mask value for the first pixel of the intermediate image frame based on application of a statistical function on the extracted set of first feature vectors and the extracted second feature vector. The operations further include generation of the intermediate FG mask based on the estimated first mask value and re-estimation of mask values for remaining pixels of the intermediate image frame.

Certain embodiments of the disclosure may be found in an electronic apparatus and a method for image-based mask frame interpolation. Various embodiments of the disclosure may provide the electronic apparatus 102 (FIG. 1) that may include the memory 204 (FIG. 2), the image sensor 104, and the circuitry 202 (FIG. 2). The image sensor 104 may be configured to capture the sequence of image frames 110. The sequence of image frames 110 may include group of image frames 112 and an intermediate image frame 114. The circuitry 202 may be configured to receive the sequence of image frames 110, including the group of image frames 112 and an intermediate image frame 114 adjacent to a first image frame 112a of the group of image frames 112. The circuitry 202 may be configured generate a group of FG masks based on application of a trained Neural Network on the group of image frames 112. The circuitry 202 may be further configured to select a RoI from the first image frame 112a based on a first FG mask of the generated group of FG masks. The first FG mask may correspond to the first image frame 112a. The circuitry 202 may be further configured to extract, from the first image frame 112a, a set of first feature vectors for a corresponding set of pixels within the selected RoI. The circuitry 202 may be further configured extract, from the intermediate image frame 114, a second feature vector for a first pixel of the intermediate image frame 114. The circuitry 202 may be further configured to estimate a first mask value for the first pixel of the intermediate image frame based on application of a statistical function on the extracted set of first feature vectors and the extracted second feature vector. The statistical function may be one of a kernel-density function or a mean-shift filter. The circuitry 202 may be further configured to generate the intermediate FG mask based on the estimated first mask value and re-estimation of mask values for remaining pixels of the intermediate image frame 114.

In accordance with an embodiment, the trained neural network may be a Convolutional Neural Network (CNN) that may accept the group of image frames 112 as input and outputs the group of FG masks for the group of image frames 112.

In accordance with an embodiment, the circuitry 202 may be configured to extract, from the first image frame 112a, the set of first feature vectors based on first pixel-level information and first temporal information of the corresponding set of pixels in the selected RoI. Each first feature vector of the set of first feature vectors may include an RGB value, a spatial position, and a temporal position of a corresponding pixel in the selected RoI.

In accordance with an embodiment, the circuitry 202 may be further configured to select an initial RoI from the first FG mask and select the RoI from the first image frame based on the selected initial RoI. The selected RoI may be partitioned into a FG region and a BG region. The set of first feature vectors, including a first group of feature vectors for a first group of pixels in the FG region and a second group of feature vectors for a second group of pixels in the BG region may be extracted from the first image frame 112a.

In accordance with an embodiment, the circuitry 202 may be configured to estimate an expectation value for the first pixel being in a FG region of the intermediate image frame 114 by application of the kernel density function on the set of first feature vectors and the second feature vector and estimate the first mask value for the first pixel based the estimated expectation value.

In accordance with an embodiment, the circuitry 202 may be further configured to estimate the first mask value as "1" based on the estimated expectation value being greater than a threshold expectation value and to estimate the first mask value as "0" based on the estimated expectation value being less than a threshold expectation value.

In accordance with an embodiment, the circuitry 202 may be configured to extract, from the intermediate image frame 114, the second feature vector based on second pixel-level information and second temporal information of the first pixel. The second feature vector may include an RGB value, a spatial position, and a temporal position of the first pixel. The second feature vector may also include a seed mask value for the first pixel.

In accordance with an embodiment, the circuitry 202 may be configured to update the second feature vector based on application of a mean-shift filter on the extracted set of first feature vectors and the second feature vector. The updated second feature vector may include an updated seed mask value. The circuitry 202 may be further configured to compare the updated seed mask value with a threshold value and correct the updated seed mask value based on the comparison of the updated seed mask value with the threshold value. The circuitry 202 may be further configured to estimate the first mask value for the first pixel as the corrected seed mask value based on the updated second feature vector satisfying a convergence condition.

In accordance with an embodiment, the circuitry 202 may be further configured to generate the intermediate FG mask further based on application of a boundary smoothing function on the estimated first mask value. The boundary smoothing function may include a morphological opening operation and a morphological closing operation on the estimated first mask value and the mask values for remaining pixels of the intermediate image frame 114. In accordance with an embodiment, the circuitry 202 may be further configured to segment the object-of-interest from the sequence of image frames based on the generated group of FG masks and the generated intermediate FG mask.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which, when loaded in a computer system, is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without deviation from the scope of the present disclosure. In addition, many modifications may be made to adapt a particular situation or material to the teachings of the present disclosure without deviation from its scope. Therefore, it is intended that the present disclosure not be limited to the particular embodiment disclosed, but that the present disclosure will include all embodiments falling within the scope of the appended claims.

What is claimed is:

1. An electronic apparatus, comprising:
   circuitry configured to:
   receive a sequence of image frames comprising a group of image frames and an intermediate image frame;
   generate a group of foreground (FG) masks based on application of a trained Neural Network on the group of image frames;

select a Region-of-Interest (RoI) from a first image frame of the group of image frames based on a first FG mask of the generated group of FG masks, wherein the first FG mask corresponds to the first image frame;
extract, from the first image frame, a set of first feature vectors for a corresponding set of pixels within the selected RoI;
extract, from the intermediate image frame, a second feature vector for a first pixel of the intermediate image frame;
estimate a first mask value for the first pixel of the intermediate image frame based on application of a statistical function on the extracted set of first feature vectors and the extracted second feature vector; and
generate an intermediate FG mask for the intermediate image frame based on the estimated first mask value and re-estimation of mask values for remaining pixels of the intermediate image frame.

2. The electronic apparatus according to claim 1, wherein the first image frame immediately precedes or succeeds the intermediate image frame.

3. The electronic apparatus according to claim 1, wherein the trained neural network is a Convolutional Neural Network (CNN) that accepts the group of image frames as input and outputs the group of FG masks for the group of image frames.

4. The electronic apparatus according to claim 1, wherein the circuitry is further configured to extract, from the first image frame, the set of first feature vectors based on first pixel-level information and first temporal information of the corresponding set of pixels in the selected RoI, and
wherein each first feature vector of the set of first feature vectors comprises an RGB value, a spatial position, and a temporal position of a corresponding pixel in the selected RoI.

5. The electronic apparatus according to claim 1, wherein the circuitry is further configured to:
select an initial RoI from the first FG mask;
select an RoI from the first image frame based on the selected initial RoI;
partition the selected RoI into a FG region and a background (BG) region; and
extract, from the first image frame, the set of first feature vectors comprising a first group of feature vectors for a first group of pixels in the FG region and a second group of feature vectors for a second group of pixels in the BG region.

6. The electronic apparatus according to claim 1, wherein the statistical function is one of a kernel density function or a mean-shift filter.

7. The electronic apparatus according to claim 1, wherein the circuitry is further configured to:
estimate an expectation value for the first pixel being in a FG region of the intermediate image frame by application of a kernel density function on the set of first feature vectors and the second feature vector; and
estimate the first mask value for the first pixel based the estimated expectation value.

8. The electronic apparatus according to claim 7, wherein the circuitry is further configured to estimate the first mask value as "1" based on the estimated expectation value being greater than a threshold expectation value.

9. The electronic apparatus according to claim 7, wherein the circuitry is further configured to estimate the first mask value as "0" based on the estimated expectation value being less than a threshold expectation value.

10. The electronic apparatus according to claim 1, wherein the circuitry is further configured to extract, from the intermediate image frame, the second feature vector based on second pixel-level information and second temporal information of the first pixel, and
wherein the second feature vector comprises an RGB value, a spatial position, and a temporal position of the first pixel.

11. The electronic apparatus according to claim 10, wherein the second feature vector further comprises a seed mask value for the first pixel.

12. The electronic apparatus according to claim 11, wherein the circuitry is further configured to:
update the second feature vector based on application of a mean-shift filter on the extracted set of first feature vectors and the second feature vector,
wherein the updated second feature vector comprises an updated seed mask value;
compare the updated seed mask value with a threshold value; and
correct the updated seed mask value based on the comparison.

13. The electronic apparatus according to claim 12, wherein the circuitry is further configured to estimate the first mask value for the first pixel as the corrected seed mask value based on the updated second feature vector satisfying a convergence condition.

14. The electronic apparatus according to claim 1, wherein the circuitry is configured to generate the intermediate FG mask further based on application of a boundary smoothing function on the estimated first mask value, and
wherein the boundary smoothing function comprises a morphological opening operation on the estimated first mask value and a morphological closing operation on the estimated first mask value.

15. The electronic apparatus according to claim 1, wherein the generated group of FG masks and the generated intermediate FG mask corresponds to binary mask images of an object-of-interest.

16. The electronic apparatus according to claim 15, wherein the circuitry is further configured to segment the object-of-interest from the sequence of image frames based on the generated group of FG masks and the generated intermediate FG mask.

17. A method, comprising:
receiving a sequence of image frames comprising a group of image frames and an intermediate image frame;
generating a group of foreground (FG) masks based on application of a trained Neural Network on the group of image frames;
selecting a Region-of-Interest (RoI) from a first image frame of the group of image frames based on a first FG mask of the generated group of FG masks, wherein the first FG mask corresponds to the first image frame;
extracting, from the first image frame, a set of first feature vectors for a corresponding set of pixels within the selected RoI;
extracting, from the intermediate image frame, a second feature vector for a first pixel of the intermediate image frame;
estimating a first mask value for the first pixel of the intermediate image frame based on application of a statistical function on the extracted set of first feature vectors and the extracted second feature vector; and
generating an intermediate FG mask for the intermediate image frame based on the estimated first mask value and re-estimation of mask values for remaining pixels of the intermediate image frame.

18. The method according to claim 17, further comprising:
estimating an expectation value for the first pixel being in a FG region of the intermediate image frame by application of a kernel density function on the set of first feature vectors and the second feature vector; and
estimating the first mask value for the first pixel based the estimated expectation value.

19. The method according to claim 17, wherein the second feature vector comprises an RGB value, a spatial position, a temporal position, and a seed mask value for the first pixel.

20. The method according to claim 19, further comprising:
updating the second feature vector based on application of a mean-shift filter function on the extracted set of first feature vectors and the second feature vector,
wherein the updated second feature vector comprises an updated seed mask value;
comparing the updated seed mask value with a threshold value;
correcting the updated seed mask value based on the comparison; and
estimating the first mask value for the first pixel as the corrected seed mask value based on the updated second feature vector satisfying a convergence condition.

* * * * *